Figure 1:
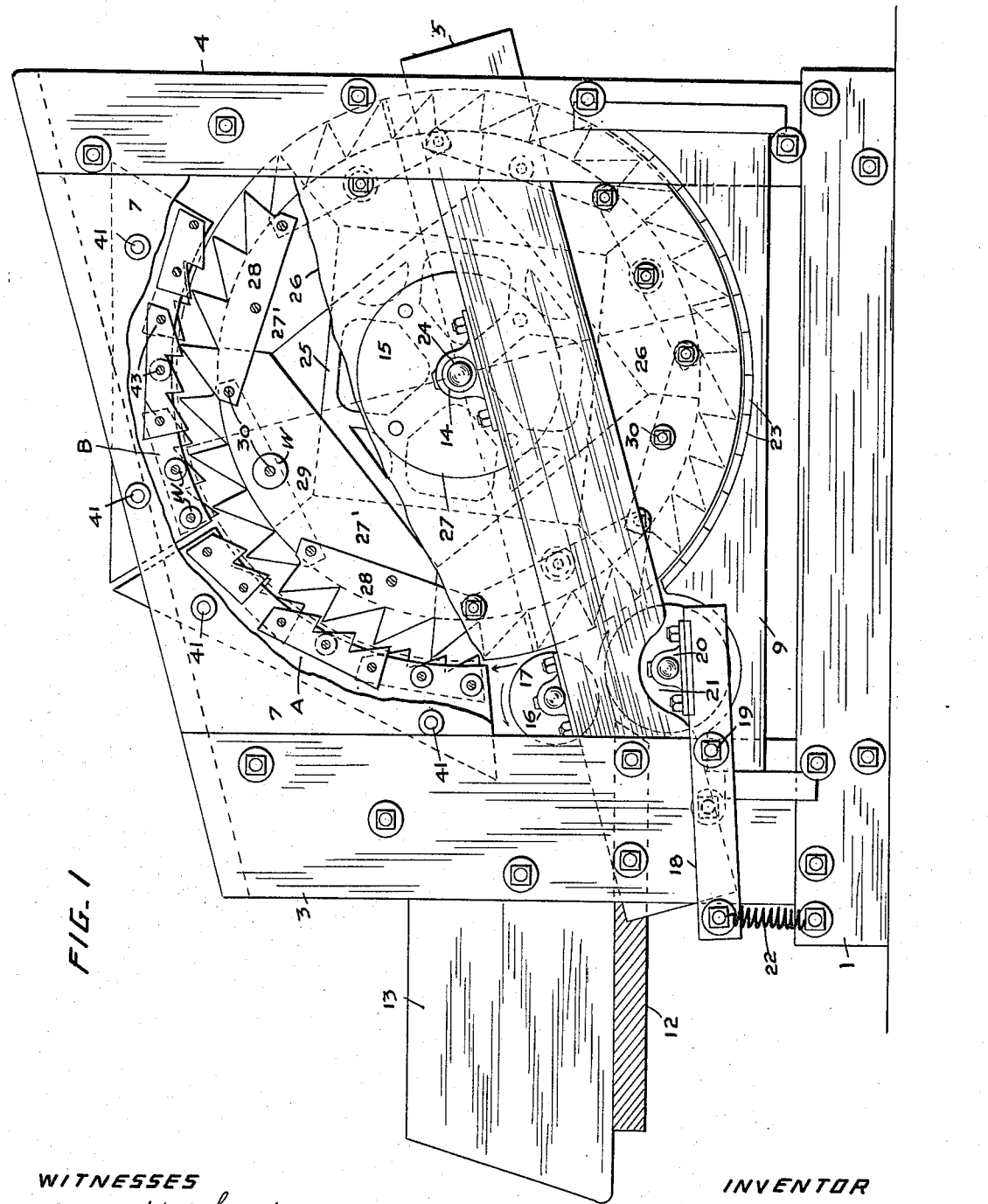

C. L. JOHNSON.
SHREDDER CYLINDER.
APPLICATION FILED DEC. 5, 1914.

1,150,198.

Patented Aug. 17, 1915.
3 SHEETS—SHEET 1.

WITNESSES
A. H. Kephart,
Léon Boillot

INVENTOR
CHARLES L. JOHNSON
Carlos P. Griffin
Att'y.

C. L. JOHNSON.
SHREDDER CYLINDER.
APPLICATION FILED DEC. 5, 1914.
1,150,198.
Patented Aug. 17, 1915.
3 SHEETS—SHEET 3.
FIG. 3
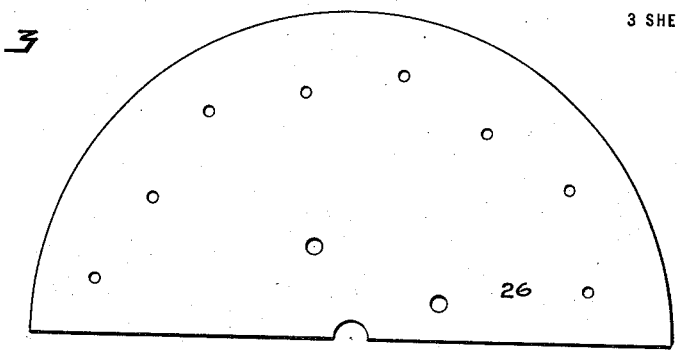
FIG. 4
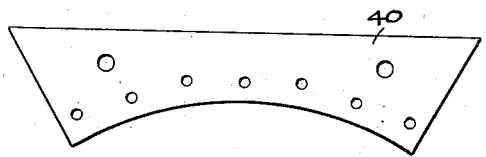
FIG. 8    FIG. 5    FIG. 7
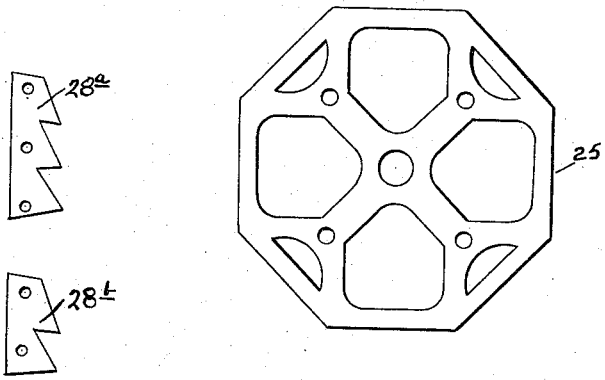 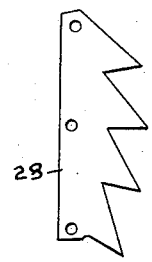
FIG. 9    FIG. 6
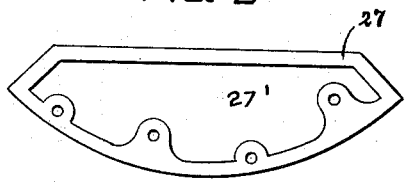
WITNESSES
A. H. Kephart
Léon Boillot
INVENTOR
CHARLES L. JOHNSON
Carlos P. Griffin
ATT'Y.

UNITED STATES PATENT OFFICE.

CHARLES L. JOHNSON, OF SAN FRANCISCO, CALIFORNIA.

SHREDDER-CYLINDER.

1,150,198.  Specification of Letters Patent.  Patented Aug. 17, 1915.

Application filed December 5, 1914. Serial No. 875,736.

*To all whom it may concern:*

Be it known that I, CHARLES L. JOHNSON, a citizen of the United States, residing at San Francisco, in the county of San Francisco, State of California, have invented a new and useful Shredder-Cylinder, of which the following is a specification in such full and clear terms as will enable those skilled in the art to construct and use the same.

This invention relates to a resilient strain distributing multidentate shredding cylinder.

An object of the invention is to produce such a cylinder by the use of a few easily made duplicate parts. This object is attained by a multiple arrangement of a plurality of sets of interchangeable parts arranged around a central axis in alternating courses or layers of spacing parts and toothed segments, each spacing course breaking joints with the preceding spacing course. Each course of toothed segments is omitted at every other section said omissions being filled with a spacing washer of suitable thickness, said washers being opposite a toothed segment in each preceding course or layer of toothed segments and thereby with a series of bolts forming a complete cylinder of connected chains or bands.

Another object of the invention is to provide a cylinder which will be easily renewed when one set of teeth is injured or worn out.

Another object is to make a cylinder capable of expanding under changes in temperature and high speed.

A further object of the invention is to produce a resilient shock absorbing cylinder which will provide in a cheap practical manner the maximum elasticity when subjected to shocks and which readily distributes them equally in all directions around and through the cylinder.

I attain these objects by the multiple arrangement of joints, spaces and duplicate washers and parts and saw steel toothed segments forming the connecting links of the cylinder, bolts extending longitudinally of the cylinder connecting the several parts thereof.

An embodiment of the invention is shown in the drawing in which the same reference numeral is applied to the same portion throughout, but I am aware that there are many modifications thereof.

Figure 2:
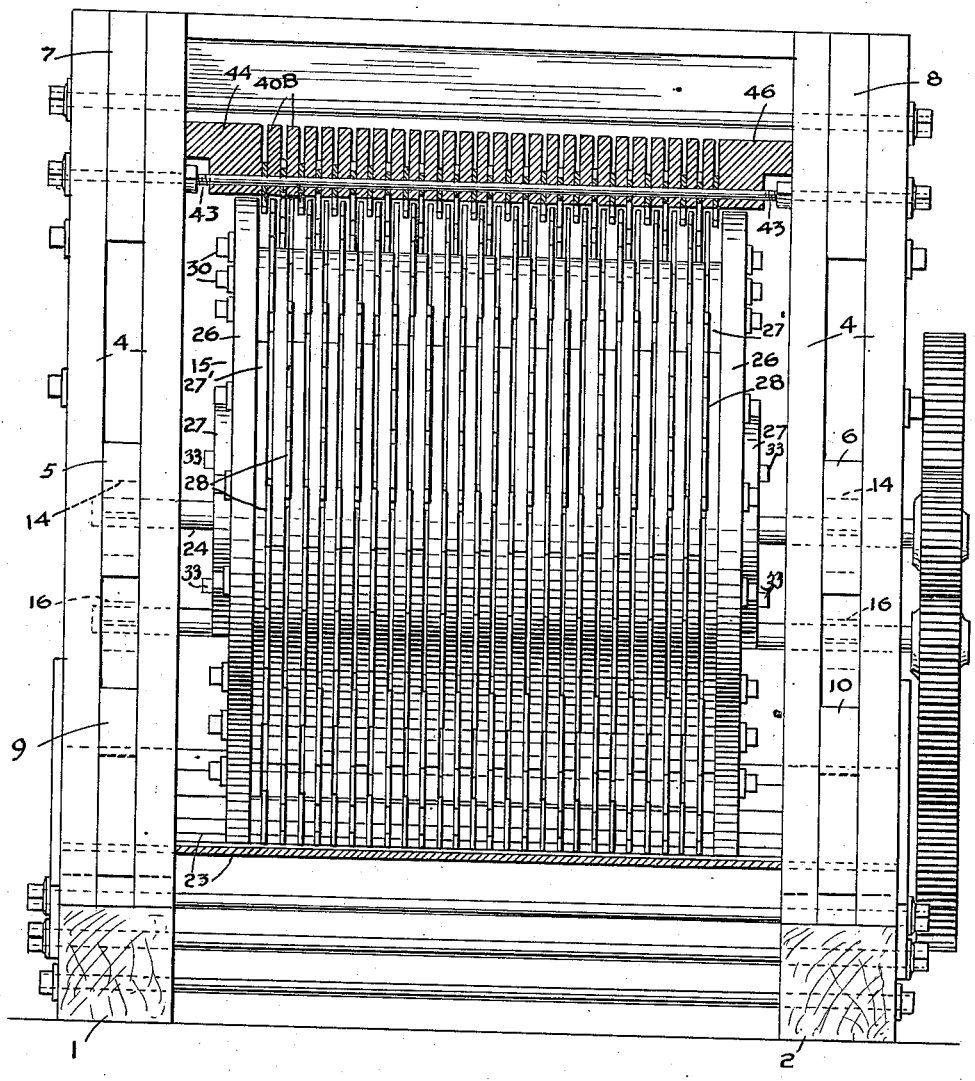

Figure 1 is a side elevation of the shredder with portions thereof broken away for purposes of illustration, Fig. 2 is a front elevation of the shredder with a portion of the toothed concave and a portion of the guard concave broken away for purposes of illustration, Fig. 3 is a plan view of one of the cylinder side pieces, Fig. 4 is a plan view of one of the concave members, Fig. 5 is a plan view of a form of core which can be used if it is desired to build the cylinder on a core of wood or metal, Fig. 6 is a plan view of one of the main segmental spacers used in the construction of the cylinder when made of wood or metal, Fig. 7 is a plan view of one of the toothed steel segments, Fig. 8 is a plan view of one of the concave steel segments carrying three teeth, and Fig. 9 is a plan view of one of the concave steel segments carrying two teeth.

The shredder is mounted upon two sills 1 and 2 which sills support two wide posts 3 and two longer and narrower posts 4. The posts carry supports 5 and 6 for the shredder cylinder and supports 7 and 8 for the toothed concave, as well as supports 9 and 10 for the guard concave at the bottom of the cylinder. The supports just mentioned all extend from the posts 3 and posts 4 and are suitably bolted thereto, while at the front of the machine there is a table 12 having hopper sides 13 to assist the workmen in feeding the material into the shredder. The table also acts as a longitudinal brace by being secured to the posts 3 and to the supports 5 and 6. The supports, 5 and 6 carry suitable boxes 14, one at each end of the shredder cylinder 15 for the support of the same. Adjacent the front of the machine the supports 5 and 6 carry boxes 16, one at each end for the support of the feed roll 17. Adjacent the bottom at the front of the machine there are two levers 18 pivoted to the two posts 3 at 19, which levers support bearing boxes 20 for the lower feed roll 21. A spring 22 pulls down on each of the levers 18 and holds the lower roll against the material being fed into the machine with sufficient pressure to prevent it from being dragged thereinto by the shredder cylinder too rapidly and at the same time it is fed forward as rapidly as may be required.

The guard concave comprises a plurality of flat boards or plates 23 mounted on the supports 9 and 10 in such proximity to the shredding cylinder as will cause the cylinder to draw all of the shredded material not thrown clear thereof back into the machine again.

The cylinder may be made of wood spacers between which are a series of steel toothed plates. The plates and spacers are mounted upon a shaft 24 which shaft carries an octagonal prismatic form 25 and the cylinder is so geared as to have a peripheral speed of from 4500 to 5000 feet per minute. The cylinder is made up of four flat semi-circular end pieces 26, two metal flanges 27 through which bolts pass to connect the end pieces and core pieces with the shaft, a plurality of spacers 27', a plurality of toothed plates 28, a plurality of washers 29 and a plurality of bolts 30.

In the construction of the cylinder one of the metal flanges 27 is placed on the shaft 24, two of the semi-circular end pieces 26 are then secured to the inside of one of the metal flanges 27 by means of the four flanged bolts which extend clear through the core pieces, after which the sixteen circumferential bolts are placed in position in the end pieces. The bolts 33 extend longitudinally of the cylinder and serve to connect the several parts thereof together. Four of the spacers 27' are next assembled on the bolts adjacent the assembled end pieces after which four of the toothed plates are assembled upon the bolts in such a manner as to break joints across the ends of the spacers, note Fig. 1, a washer of the same thickness as the toothed segments is then placed on each of the remaining bolts, whereupon a series of spacing plates 27' is assembled in such a manner as to have its joints come in the middle of the next adjacent spacers, whereupon another set of toothed plates and washers are assembled upon the bolts in such a manner as to cause the toothed plates to overlie the ends of the next adjacent spacers. The assembly is continued until the entire cylinder is completed, the last course being a set of spacing plates 27', whereupon two additional semi-circular plates 26 are put in position on the bolts and the remaining metal flange 27 is then secured in place outside the plates 26. The nuts are then placed upon the bolts and the entire cylinder is drawn together tight to an even thickness by means of the bolts.

The toothed concave is made up of one or more sections A and B, each identical with the other in construction. The concave is made of a plurality of parts 40 of the shape illustrated in Fig. 4 so that a description of only one concave will be given. Bolts 41 extend entirely through the machine and support the concaves, there being two bolts to each part A and B. Each concave has a wide part 44 and 46 which parts are connected to the remaining segments 40 by means of a plurality of bolts 43. The parts 44 and 46 are of such a width as to just bring the first toothed plates $28^A$ and $28^B$ in the middle of the space between the end pieces of the cylinder and the first series of toothed plates 28 carried thereby.

The concave is assembled by passing the bolts 43 through one of the parts 44 or 46 after which the toothed segments $28^A$ and $28^B$ and washers W are assembled thereon together with the members 40, the toothed segments and members 40 being alternated while the toothed segments are alternated in position as indicated in Fig. 4. After all of the spacers, toothed segments and washers have been assembled they are secured together by tightening the nuts down on said bolts and drawing the concave down to an even thickness corresponding with the spacing of the toothed plates of the cylinder. The concaves are secured to the machine by inserting the bolts 41 through the parts 7 and 8 and through corresponding holes in the concaves.

The advantages of the construction shown lies in the fact that each plate can be made of tempered saw steel and carries a plurality of teeth which adds greatly to the strength and durability of the shredding points. The multiplicity of parts makes the replacement of any one an easy matter since all that is necessary is to loosen several of the bolts and replace any given segment, whereupon the bolts may be returned to their original position and again tightened up. The elasticity of the cylinder due to its construction of a great multiplicity of parts interlocked together and forming strong chains around the core or central axis causes all shocks and strains to be resiliently met and distributed both around and across the cylinder thereby preventing serious injury to the teeth as well as to provide for expansion due to high speed and changes in temperature. The sectional and segmental construction of the concave provides for a delicate uniform and proper adjustment of the concave to the cylinder in longitudinal positioning of the teeth on said two parts, the bolts being tightened to suit.

Having thus described my invention what I claim as new and desire to secure by Letters Patent of the United States, is as follows, modifications within the scope of the claims being expressly reserved:

1. A shredder cylinder comprising a shaft, semi-circular end pieces, a plurality of segmental spacers, circumferentially longitudinally extending bolts, and a plurality of toothed plates assembled side by side, each toothed plate breaking joints with an adjacent pair of segments.

2. A shredder cylinder comprising a shaft, circular end pieces on said shaft, a plurality of bolts extending longitudinally of said cylinder adjacent the circumference thereof, and a plurality of short toothed plates mounted on said bolts adjacent the segmental spacers, the plates breaking joints with an adjacent spacer.

3. In a shredder cylinder, the combination of a shaft, circular end pieces therein, a plurality of segmental spacers, a plurality of bolts extending through said circular pieces and through said segmental pieces adjacent the periphery of the cylinder, a plurality of toothed plates, and bolts adjacent the spacers and breaking joints with an adjacent spacer, said plates being so arranged so that two adjacent rows thereof with the bolts passing through them form a complete chain around the cylinder.

4. In a shredder cylinder, the combination of a shaft, a core mounted thereon, circular end pieces, a plurality of segmental spacers, bolts extending through said segmental spacers and the end pieces, and a plurality of toothed plates between the series of spacers, the spacers being arranged to break joints with adjacent spacers and the toothed plates to break joints with the spacers adjacent them.

5. A concave for shredders comprising a plurality of spacing segments, a plurality of toothed segments between the spacing segments, and bolts extending through all of the spacing segments and toothed segments to secure the concave together.

6. A concave for shredder cylinders comprising a plurality of spacing segments, a plurality of alternately positioned different sized toothed segments, and a plurality of bolts extending through the spacing segments and toothed segments for securing the parts of the concave together.

In testimony whereof I have hereunto set my hand this 7 day of November, A. D. 1914, in the presence of the two subscribed witnesses.

CHARLES L. JOHNSON.

Witnesses:
C. P. GRIFFIN,
L. H. ANDERSON.

Copies of this patent may be obtained for five cents each, by addressing the "Commissioner of Patents. Washington, D. C."